United States Patent Office 3,220,870
Patented Nov. 30, 1965

3,220,870
COMPOSITE ARTICLES AND METHOD
OF MAKING THE SAME
Harry F. Loehrke, Toledo, Ohio, assignor to Owens-Illinois, Inc., a corporation of Ohio
No Drawing. Filed Dec. 30, 1960, Ser. No. 85,443
8 Claims. (Cl. 117—22)

This invention relates to composite articles comprising a crystallized glass and a layer of relatively high thermal conductivity with respect to the glass and to a method of making the same.

In recent years the use of ceramics made from crystallized glass has come into extensive use for certain purposes, particularly where overall strength and resistance to heat are desired. However, the use of crystallized glass for cooking ware that is to be used in direct contact with burner elements has been found to have a serious disadvantage due to the poor thermal conductivity of the crystallized glass. As a result, food placed in a crystallized glass cooking vessel, which is in direct contact with a burner element or flame, will be burned if it is immediately above the burner element; and food which is only a short distance away but not directly over a burner flame, will remain substantially uncooked.

In view of the above limitation relating to the use of devitrified glass for top of the stove ware, it is a primary object of this invention to provide crystallized glass ware which has been subsequently modified to improve thermal conductivity.

It is a further object of this invention to provide a method for the manufacture of the aforesaid modified crystallized glass ware.

A still further object of this invention is to provide crystallized glass ware which is suitable for use in direct contact with a source of heat of varying intensity.

These and other objects will be apparent from the description which follows:

In accordance with the present invention crystallized or devitrified glass, and particularly cooking vessels made thereof, is made thermally conductive by sealing a thermally conductive layer to that portion of the crystallized glass which is in direct contact with the burner elements or flames. The resulting article, such as a cooking vessel, when placed over burner elements will conduct the heat substantially in a uniform manner over the bottom of the cooking vessel, thereby preventing localized hot and cold areas which would result in burning and undercooking, respectively, of food placed in the cooking vessel. It will be apparent from the description of the invention, particularly the examples, that the thermally conductive layer has a relatively high thermal conductively with respect to the crystallized glass.

The manner in which cooking ware made of crystallized glass is made thermally conductive can be illustrated as follows. A batch consisting of the following composition is melted in accordance with conventional glass melting procedure and apparatus, preferably at a temperature of about 2600° to 3000° F.

| Ingredient: | Percent by weight |
|---|---|
| $SiO_2$ | 46.9 |
| $Al_2O_3$ | 30.8 |
| MgO | 11.2 |
| NaF | 1.0 |
| $ZrO_2$ | 8.0 |
| $TiO_2$ | 1.5 |
| $SnO_2$ | 0.2 |
| $Li_2O$ | 0.75 |

The molten glass is then formed or molded into the shape of a shallow rectangular cooking vessel at a temperature of about 100° F. below the melting temperature or preferably from about 2500° to about 2800° F. The formed glass is then subjected to a heat treatment for the purpose of crystallizing or devitrifying the glass, of which the first stage is the maintenance of the cooking vessel at a temeprature corresponding to its annealing point. The holding of the composition at the annealing point, with a variation of only about 20° to 50° F. therefrom, results in the formation of sub-microscopic crystals of the nucleating agent ($ZrO_2$). This first stage, which is called the "nucleation" stage, is followed by a "development" stage during which the glass cooking vessel is maintained at a temperature preferably about 10° to 30° F. below the fiber softening point thereof. Thereafter, the glass is maintained at a temperature of about 150° to 300° F. above the softening point, which is called the "growth" stage, whereby the glass is crystallized to substantial completeness such that the glass vessel is now about 90 to 95% crystalline.

In the present example, the times and temperatures for each of these stages were as follows:

| Devitrification Stages | Temperature, °F. | Time, hours |
|---|---|---|
| Nucleation | 1,400 | 1.5 |
| Development | 1,700 | 1.5 |
| Growth | 1,950 | 1.5 |

Thereafter, the resulting crystallized cooking glass vessel is cooled to a temperature of about 1250° F. and the bottom of the vessel is immersed in a bath of molten aluminum to a depth of one-half inch. The now coated vessel is then removed from the bath and placed in a lehr and slowly cooled to room temperature.

Instead of molten aluminum, a bath of molten copper can be used, but the copper is preferably applied in an inert atmosphere.

The foregoing example illustrates one mode of making a crystallized glass container capable of conducting heat uniformly and evenly. However, the heat conductive layer can also be applied as a glaze, which is inherently heat conductive, or which contains metal particles which render the glaze heat conductive.

As an example of an inherently heat conductive layer, which can be employed, is the following composition:

| Component: | Percent by weight |
|---|---|
| $SiO_2$ | 38.0 |
| BaO | 44.0 |
| $B_2O_3$ | 6.5 |
| CaO | 4.0 |
| BeO | 2.5 |
| ZnO | 5.0 |

Seventy parts of the above composition are mixed with 30 parts of chromic oxide, 5 parts of enamel clay, and 48 parts of water. After milling and application of this mixture to the crystallized glass container, this mixture or ceramic glaze is fired at 1850° F. from 3 to 10 minutes. Caution must be exercised in handling this composition because of the high toxicity of the beryllia.

Illustrative of a ceramic glaze which contains metal particles that render the glaze heat conductive is the following:

| Composition: | Percent by weight |
|---|---|
| $SiO_2$ | 36.3 |
| $B_2O_3$ | 14.1 |
| $CoO$ | 1.3 |
| $NiO$ | 0.5 |
| $K_2O$ | 3.6 |
| $Al_2O_3$ | 26.4 |
| $CaO$ | 4.5 |
| $Na_2O$ | 12.3 |
| $MnO$ | 1.0 |

To the above is added from 5 to 50% of powdered silver, copper, and similar conductive metals about 1 micron in size to form the completed glaze which is applied to the surface of a crystallized glass and fired at 1600° F. for 10 minutes.

In addition, the hot crystallized glass vessel can be immersed in a bath of metallic powder which will fuse and adhere to the contacted surface of the devitrified glass vessel.

Various glazes, metals, and alloys can be employed for the heat conducting layer provided that they are somewhat thermally compatible with the crystallized glass vessel. In the example given above, the crystallized glass used has a coefficient of expansion of $110.6 \times 10^{-7}$ from 0° to 300° C. Accordingly, other metals such as copper and silver, and particularly alloys of copper and silver, can be employed providing their melting points are less than about 1950° F. By way of specific example, an aluminum bronze (90 Cu, 10 Al) would prove satisfactory.

It will also be apparent to those skilled in the art that cooking vessels or ware can be first made of crystallized glass and thereafter given a heat treatment in which, for example, the heated vessel is dipped in a molten bath of a thermally compatible metal or alloy. However, the example given above has the advantage over this modification of not requiring reheating of the crystallized vessel after it has been formed and allowed to cool to room temperature.

Although one method of obtaining substantially crystallized glass has been described, it is apparent that the present process of improving the thermal conductivity of crystallized glass can be applied to other crystallized glasses which have been prepared by other processes. In this connection, the method disclosed herein for obtaining crystallized glass is described in greater detail in patent application Serial No. 846,551, filed October 15, 1959, now U.S. Pat. No. 3,117,881, and which is assigned to the same assignee as the present application.

It will also be noted that although crystallized glass containers have been primarily referred to above, the present invention applies to glass articles in general, having a crystallized glass base layer and a thermally conductive coating thereon for the purpose of diffusing heat from a plural heat source which is being applied to said base layer whereby the heat applied tends to be conducted in a uniform manner through said base layer.

While I have described and illustrated a preferred embodiment of my invention, I wish it to be understood that I do not intend to be restricted solely thereto, but that I do intend to cover all modifications thereof which come within the spirit and scope of my invention.

I claim:
1. A method of imparting thermal conductivity to a devitrified glass container comprising immersing a non-roughened portion of said container in a molten thermally compatible coating material which is at a temperature less than 1950 F., which is thermally conductive when solidified and which adheres to said container bottom, and thereafter cooling said glass container with the layer of thermally conductive material adhering to the bottom thereof, said layer having a relatively high thermal conductivity with respect to the devitrified glass.

2. The method of claim 1 in which the molten material consists of a molten metal.

3. The method of claim 1 in which the molten material consists of a molten alloy.

4. The method of claim 1 in which the molten material consists of a conductive ceramic glaze.

5. The method of claim 1 in which the molten material consists of a ceramic glaze containing metal particles for imparting thermal conductivity.

6. A method of imparting thermal conductivity to a devitrified glass container having a bottom and sides, comprising immersing the bottom of said container in a molten thermally compatible coating material which is at a temperature less than 1950° F., which is thermally conductive when solidified and which adheres to the container bottom, and thereafter cooling said glass container with the layer of thermally conductive material and adhering to the bottom thereof, said layer having a relatively high thermal conductivity with respect to the devitrified glass.

7. A method of imparting thermal conductivity to a devitrified glass container comprising heating a non-roughened portion of said container to a high temperature but less than 1950° F., immersing said portion into a thermally compatible powder whereby the powder is fused and caused to adhere to said portion and thereafter cooling said glass container whereby the layer of fused powder is solidified so as to form a continuous conductive layer on said portion, said layer having a relatively high thermal conductivity with respect to the devitrified glass.

8. A thermally conductive devitrified glass container made by the process of claim 1.

References Cited by the Examiner

UNITED STATES PATENTS

| 2,040,102 | 5/1936 | Peron | 126—390 |
| 2,053,923 | 9/1936 | Stewart | 65—60 X |
| 2,151,983 | 3/1939 | Merrill | 65—60 |
| 2,511,404 | 6/1950 | Glenkey et al. | 126—390 |
| 2,563,130 | 8/1951 | Mylchreest | 61—348 |
| 2,699,510 | 1/1955 | Smelt | 117—129 |
| 2,703,949 | 3/1955 | Gaiser | 65—60 |
| 2,960,802 | 11/1960 | Voss | 65—33 |
| 2,977,251 | 3/1961 | Long | 117—129 X |
| 3,102,043 | 8/1963 | Winthrop et al. | 117—21 |

DONALL H. SYLVESTER, *Primary Examiner.*

ARTHUR P. KENT, *Examiner.*